United States Patent [19]
Weber et al.

[11] Patent Number: 5,920,058
[45] Date of Patent: Jul. 6, 1999

[54] HOLOGRAPHIC LABELING AND READING MACHINE FOR AUTHENTICATION AND SECURITY APPLICATIONS

[76] Inventors: David C. Weber, 19 Calle Liberacion, Rancho Santa Margarita, Calif. 92688; James D. Trolinger, 3417 Wimbledon Way, Costa Mesa, Calif. 92626

[21] Appl. No.: 08/731,948

[22] Filed: Oct. 23, 1996

[51] Int. Cl.⁶ .................................................. G06K 7/10
[52] U.S. Cl. .......................... 235/457; 235/454; 235/490; 235/495; 359/1
[58] Field of Search .................................. 235/381, 382, 235/454, 435, 439, 442, 457, 458, 489, 490, 495; 380/18; 382/244, 248, 115; 359/1, 2

[56] References Cited

U.S. PATENT DOCUMENTS

| | | | |
|---|---|---|---|
| 3,506,327 | 4/1970 | Leith et al. ................................ | 359/23 |
| 3,643,216 | 2/1972 | Greenaway et al. ................. | 235/457 X |
| 3,819,911 | 6/1974 | Greenaway ............................ | 235/457 |
| 4,014,602 | 3/1977 | Ruell ....................................... | 283/7 X |
| 4,108,367 | 8/1978 | Hannan .................................. | 235/457 |
| 4,143,810 | 3/1979 | Greenaway ......................... | 235/457 X |
| 4,159,417 | 6/1979 | Rubincam .............................. | 235/375 |
| 4,171,766 | 10/1979 | Ruell ...................................... | 235/487 |
| 4,389,564 | 6/1983 | Flair et al. ........................... | 235/485 X |
| 4,464,566 | 8/1984 | Silverman et al. .................... | 235/382 |
| 4,492,855 | 1/1985 | Garczynski et al. ................. | 235/485 X |
| 4,563,024 | 1/1986 | Blyth ...................................... | 283/91 |
| 4,589,686 | 5/1986 | McGrew ................................ | 283/85 |
| 4,599,511 | 7/1986 | Stiller .................................. | 235/485 X |
| 4,641,017 | 2/1987 | Lopata .................................... | 235/457 |
| 4,677,285 | 6/1987 | Taniguchi .............................. | 235/488 |
| 4,684,795 | 8/1987 | Colgate, Jr. ............................ | 235/457 |
| 4,687,282 | 8/1987 | Ferrante ................................. | 350/3.7 |
| 4,725,111 | 2/1988 | Weitzen et al. ........................... | 359/12 |
| 4,761,543 | 8/1988 | Hayden ................................... | 235/457 |
| 5,095,194 | 3/1992 | Barbanel ................................ | 235/379 |
| 5,138,604 | 8/1992 | Umeda et al. ...................... | 235/457 X |
| 5,306,899 | 4/1994 | Marom et al. ......................... | 235/382 |
| 5,336,871 | 8/1994 | Colgate, Jr. ............................ | 235/380 |
| 5,485,312 | 1/1996 | Horner et al. ......................... | 359/561 |
| 5,570,207 | 10/1996 | Chang ................................ | 235/457 X |
| 5,627,663 | 5/1997 | Horan et al. ........................ | 235/457 X |
| 5,763,862 | 6/1998 | Jachimowicz et al. ............. | 235/457 X |

FOREIGN PATENT DOCUMENTS 6-4702  1/1994  Japan .

OTHER PUBLICATIONS

J R. Thoma, M. Dratz, N. Hampp, "All–optical nonlinear holographic correlation using bacteriorhodopsin films," Optical Engineering, v. 34, n. 5, pp. 1345–1351 (May 1995).

Primary Examiner—Michael G. Lee

[57] ABSTRACT

A holographic security label and automated reading machine for marking and subsequently authenticating any object such as an identification badge, a pass, a ticket, a manufactured part, or a package is described. The security label is extremely difficult to copy or even to read by unauthorized persons. The system comprises a holographic security label that has been created with a coded reference wave, whose specification can be kept secret. The label contains information that can be extracted only with the coded reference wave, which is derived from a holographic key, which restricts access of the information to only the possessor of the key. A reading machine accesses the information contained in the label and compares it with data stored in the machine through the application of a joint transform correlator, which is also equipped with a reference hologram that adds additional security to the procedure.

16 Claims, 5 Drawing Sheets

HOLOGRAPHIC LABELING AND READING MACHINE FOR AUTHENTICATION AND SECURITY APPLICATIONS

REFERENCES CITED

U.S. PATENT DOCUMENTS

U.S. Pat. No. 4,725,111, February 1988, Weitzen, et. al.

U.S. Ser. No. 08/265,676 June 1994, Haines.

U.S. Pat. No. 5,095,194, March 1992, Barbanel.

U.S. Pat. No. 4,563,024, January 1986, Blyth.

U.S. Pat. No. 4,589,686, May 1986, McGrew.

U.S. Pat. No. 5,336,871, August 1994, Colgate, Jr.

U.S. Pat. No. 5,485,3 12, January 1996, Horner et. al.

U.S. Pat. No. 3,506,327, April 1970, Leith et. al.

OTHER PUBLICATIONS

R. Thoma, M. Dratz, N. Hampp, "All-optical nonlinear holographic correlation using bacteriorhodopsin films," Optical Engineering, v. 34, n. 5, pp. 1345–1351 (May 1995).

SPECIFICATION

A holographic security label and automated reading machine for marking and subsequently authenticating any object such as an identification badge, a pass, a ticket, a manufactured part, or a package is described. The security label is extremely difficult to copy or even to read by unauthorized persons. The system comprises a holographic security label that has been created with a coded reference wave, whose specification can be kept secret. The label contains information that can be extracted only with the coded reference wave, which is derived from a holographic key, which restricts access of the information to only the possessor of the key. A reading machine accesses the information contained in the label and compares it with data stored in the machine through the application of a joint transform correlator, which is also equipped with a reference hologram that adds additional security to the procedure.

BACKGROUND

1. Field of the Invention

This invention relates to security and authentication, specifically to an improved, secure, identification and authentication system.

2. Description of Prior Art

Security cards, tags, and seals are used for identification, verification and authentication to protect and control assets, entry, access, and information. Such devices can be used to authorize entry into a secured area, authenticate or verify an original object, or protect a sealed container against tampering. To be effective, such devices must be difficult to copy or alter and their function or effect must be difficult to simulate. They must also be easy and efficient to use and sufficiently low in cost to be justifiable. Some of the classical problems addressed with such devices are the following:

1. The need for an identification card that is impossible to duplicate, alter, or use in a fraudulent manner.

2. The need of a tamper proof seal that cannot be covertly broken and resealed.

3. The need to mark an inspected item such that, at a later time, a quick inspection will identify it unquestionably as the same item that was previously inspected and marked. Such need exists, for example, to mark a genuine item so that it can be identified later as genuine.

4. The need for security devices that cannot be read by unauthorized persons.

5. The need for security devices that are much less expensive to produce and use than the items they protect.

This invention relates to the use of holograms and the holographic process to produce a security label. A prior art example of holographic security labeling which has prevented the loss of many millions of dollars in revenues is found in the use of embossed holograms (U.S. Pat. No. 4,725,111, February 1988, Weitzen, et. al.). Embossed holography is an extremely unsophisticated commercial application of holography that is a trade-off between cost and effectiveness. Unfortunately, counterfeiters in recent years have mastered the copying of the simple holographic label, rendering its value as a security device questionable.

Ordinary holograms were good security marking devices only as long as they were extremely difficult for counterfeiters to produce. They still provide an obstruction to the unsophisticated counterfeiter who does not have access to hologram production technology; however; hologram production technology is now so widespread that holograms are widely available and consequently no longer deter counterfeiters of many devices.

Various methods have been developed to enhance the security of marking labels. Such features are designed to make the label more difficult to copy or more expensive for the counterfeiter to produce. One of the methods used to produce an advanced holography security label that results in more sophisticated security features is called a surface-referenced hologram (Ser. No. 08/265,676 June 1994, Haines). The surface-referenced hologram must be viewed by using a reference wave that is unique to the surface on which the hologram is placed. That is, the reference wave is derived from the light scattered by the surface itself. The main disadvantage with surface-referenced holograms as security devices is that they can be copied by using a holographic recording process. Then if the counterfeiter has the technology to create a hologram on a counterfeit surface, he can create a counterfeit part with a hologram just like the genuine part. Another disadvantage is that a counterfeiter can easily view and analyze the marking.

Many other security markings based on the diffraction of light have been produced (U.S. Pat. No. 5,095,194, March 1992, Barbanel; U.S. Pat. No. 4,563,024, January 1986, Blyth; U.S. Pat. No. 4,589,686, May 1986, McGrew; U.S. Pat. No. 5,336,871, August 1994, Colgate, Jr.). They all suffer from the shortcomings that the counterfeiter can see the information contained in the label and can copy this information, allowing him to reproduce the label by advanced techniques.

To make labels difficult for the counterfeiter to read (using amplitude sensitive devices such as CCD cameras or copy machines) Horner and Javidi have mixed the information that is to be stored in the label with random phase and amplitude coding so that the unauthorized viewer can see nothing meaningful by looking at the label. (U.S. Pat. No. 5,485,312, January 1996, Horner et. al.). This requires a system that will allow the authorized reader to read the label or, in particular, to compare the information in the label, such as a fingerprint, photograph, or other biometric data, with a reference, which is drawn from a database stored elsewhere. The Horner and Javidi system is effective in coding information in a label so that it cannot be read by an unauthorized viewer and in automatically extracting the information from the coded label. However, the label can be copied using standard interferometric means, even though it cannot be converted easily to useful information without the availability of the coding information. Also, the Horner and Javidi system requires the use of a sophisticated CCD array, computer, and Fourier transforming software. Consequently, the Horner and Javidi system is relatively complicated and expensive.

Objects and Advantages

An important objective of this invention is to provide a technique that can secure optical information in a holographic seal that cannot be seen, read, copied, or simulated without access to a second "key" hologram that is placed in contact with the seal. The key hologram is secured by either limiting its access to authorized personnel only, such as an inspector, or by housing it in a reading machine in such a manner that direct access to the key is impossible without destroying its content.

Another objective of this invention is to provide a technique of correlating the information contained in the above seal with a reference mask consisting of: (1) interfering the coherent, optical signals from the seal with that of the reference mask in the Fourier plane, (2) recording the resulting fringes on an optically sensitive material (e.g., the refractive index or transmissivity of the material is affected by the intensity of an incident light source), and (3) using these fringes to generate a correlation signal. The optical signals from the seal can be the result of the reconstruction of the information contained in the hologram described in the above paragraph, a more conventional hologram, or any other material or surface that affects the phase and/or amplitude of an incident, coherent wavefront (either in reflection or transmission).

Accordingly, the invention provides the means for security marking or labeling an object, such as a manufactured part, a document, or a security entry card, or other type of identification card, with a holographic security label in a way that the mark is extremely difficult to copy, reproduce or even read or analyze without access to a special key. A relatively simple, low-cost reading machine is used to inspect the security label automatically and to compare the information contained in it with other reference information. The security label of the invention is easily readable by an authorized person and is virtually unreadable by an unauthorized person. The security label can be produced by an authorized person at a low cost per marking.

DRAWING FIGURES

In the drawings, closely related figures have the same number but different alphabetic suffixes.

REFERENCE NUMERALS IN DRAWINGS

1. Transparency that contains identification information such as fingerprints, photographs, serial numbers.
2. Transparency that contains random or otherwise coded optical phase information that is not available to the unauthorized person.
3. Holographic security label produced with random or otherwise coded reference waves and coded object waves that are not available to an unauthorized person.
4. Random or otherwise coded object wave used to produce the holographic security label.
5. Light wavefront that illuminates the transparencies used to make the object wave for the holographic security label.
6. The encoded object wave recorded in the holographic security label.
7. The holographic key used to play back the holographic security label.
8. Wavefront that is reconstructed from the holographic key.
9. Collimated reference wave used to form the holographic key.
10. Collimated reconstruction wave used to playback the holographic key.
11. Input transparency used to form an input to the optical system.
12. Input distribution of light to the optical transform system.
13. Fourier transforming lens.
14. Output Fourier transform plane of the system.
15. Output optical distribution of light from the system.
16. Input light to illuminate the transparency form the input distribution.
17. Transformed light from the lens.
18. Input transparency being checked.
19. Distribution of light formed by the input transparency.
20. Light illuminating the transparency.
21. Light illuminating a second reference transparency.
22. Reference transparency.

23. Light distribution emerging from the reference transparency.
24. Fourier transforming lens.
25. Transformed wavefront from transparency 18.
26. Transformed wavefront from transparency 22.
27. Fourier transform plane.
28. Sum of the Fourier transforms of transparencies 18 and 22.
29. Illuminating beam.
30. Diffraction grating.
31. Intensity distribution recorded in the diffraction grating 30.
32. Diffracted beam from 30.
33. Plane coherent wavefront illumination input to correlator.
34. Reference amplitude distribution to be correlated with information in the label 37.
35. Light Detector.
36. Light distribution from the reference 34.
37. Light distribution from the security label, 3.
38. Correlation signal being focused to the detector, 35.
39. Photo-refractive material.
40. Read beam for reading the diffraction grating in the photorefractive material, 39.
41. Card, such as an identification card, that contains a holographic security label.
42. Laser.
43. First mirror.
44. Second mirror.
45. Reference wave.
46. Reference wave lens.
47. Beamsplitter.
48. Object wave lens.
49. Hologram.
50. Object wave.
51. Object with word "valid" inscribed on it.
52. Image of object with word "valid" inscribed on it.
53. Light appearing to come from reconstructed image of object.
54. Reconstruction wave.
55. Viewer of image in hologram.

DESCRIPTION—FIGS. 1–10

Figure 1:
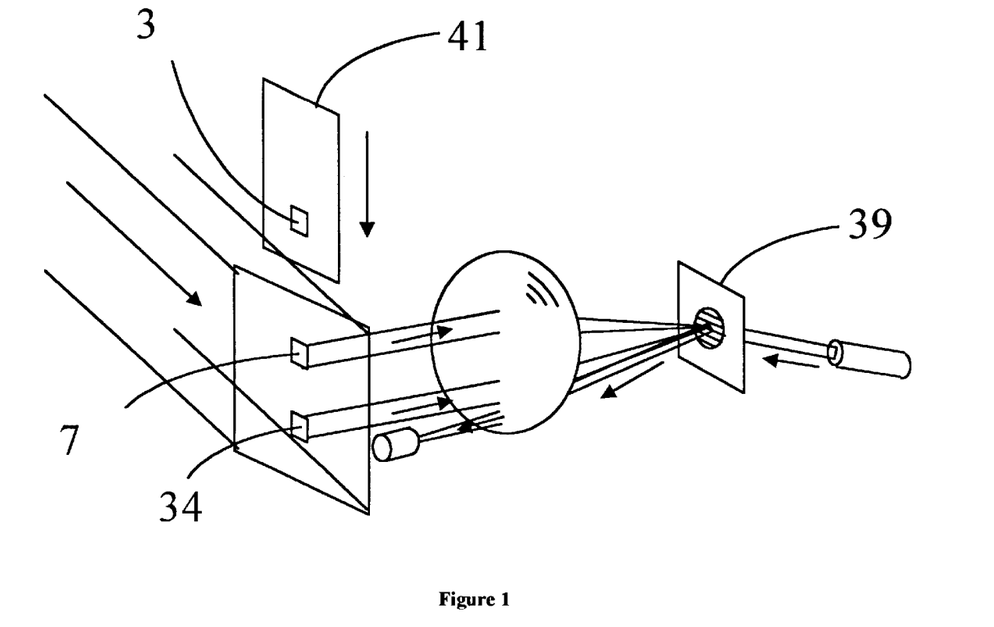
FIG. 1 is a perspective view of the invention, showing how a holographic ID card is inserted into the reading machine, which decodes and reads the card then automatically compares the information in the ID card with data stored in the reading machine.

FIG. 1 provides a prospective and side views of the invention. The invention comprises five main parts:

1) A holographic security label 3 that can be mounted on a card 41, such as an identification card or other surface or other carrying means. The label contains information that cannot be accessed without a specially coded reference wave. The information in the holographic label may be coded using amplitude, phase, or polarization information, and in such a way that more than one level of decoding is required before the information is usable. The hologram is produced in such a way that its information is dispersed in a three-dimensional volume, making it extremely difficult to copy using either amplitude or phase sensitive means, 2) A holographic key 7 that, when implemented with a reading means, provides decoding means that allows access to the information in the security label, 3) A reference hologram 34 that contains information that is identical to information contained in the holographic security label, 4) A reading machine that incorporates a joint transform correlator (JTC) that provides an automated reading means to read and analyze information in the label. The reading machine can automatically compare the information stored in the security label with other information drawn from a separate source. If the information stored in the holographic security label is coded at more than one level, the correlator can provide a decoding means for higher levels of coding, and 5) A packaging and alignment system that allows all of the components to be implemented and properly aligned.

We describe here the holograms and a method for producing the holograms that comprise the holographic security label 3, the holographic key 7, and the reference hologram 34.

Figure 3:
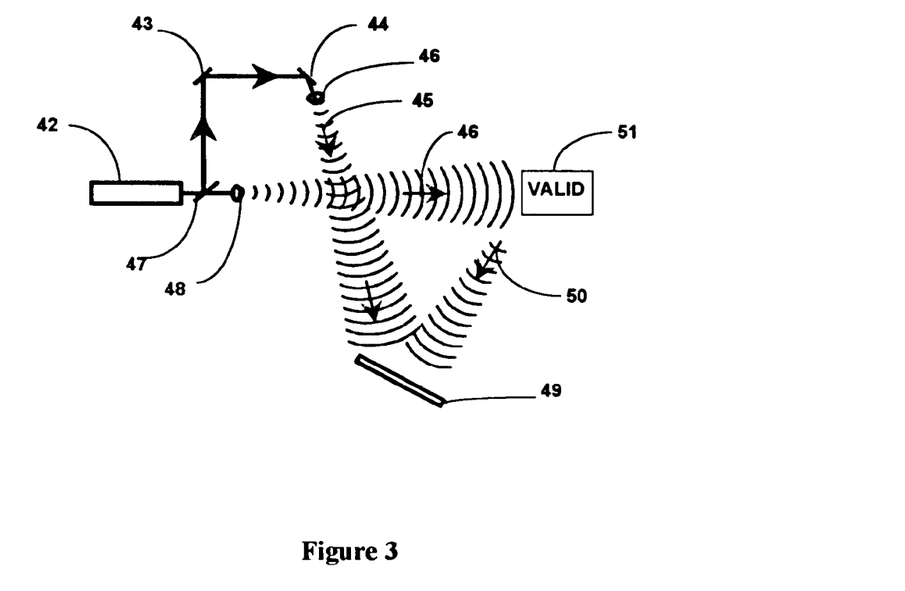
FIG. 3 is a description of the process of recording a hologram of an object, wherein a reference beam of coherent light is mixed with light scattered from the object and the intensity of the sum is recorded.

A prior art method used to produce holograms is shown in FIG. 3 (U.S. Pat. No. 3,506,327, April 1970, Leith et al). A hologram 49 of an object 51 is produced, by mixing and recording coherent laser light, produced by a laser 42, that has been scattered from the object, that light being called the object wave 50, with a second wave of light, that light being called the reference wave 45. The intensity of the two added waves is recorded by a recording means, such as by allowing them to fall on a high resolution, photographic material, then photographically processing the material. The processed material is called the hologram of the object. The light from the laser, shown in FIG. 3, is split into two components by a beamsplitter 47, where after the object wave is spread by a lens 48 and illuminates the object 51, shown as a box with the letters "VALID" marked upon it. Some of this light scatters and falls upon the hologram 49 being produced. The reference wave is conducted by a second path through mirrors 43 and 44 and a lens 46 and finally falling upon the hologram being produced and mixing with the object wave at the hologram. The exposed recording material is then processed by conventional developing procedures after which it becomes a hologram of the object.

Figure 4:
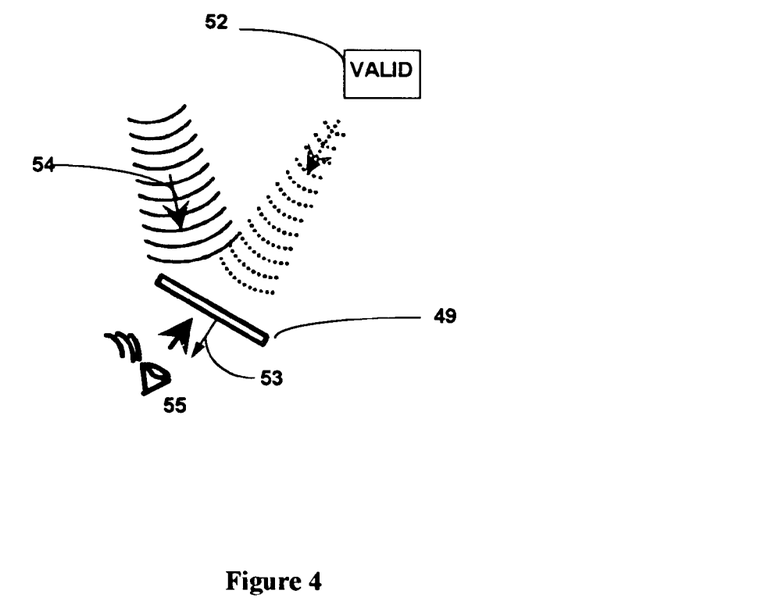
FIG. 4 shows the process of playing back a hologram by illuminating it with the same reference wave used to produce it. This allows a viewer to see an image of the originally recorded object.

If the hologram, as shown in FIG. 4, is then re-illuminated by an optical reconstruction wave, 54, that is sufficiently like the original reference wave, the hologram will diffract part of the reconstruction wave, converting that part into a diffracted wave 53 that appears to a viewer 55 to come from an image 52 of the original object 51. This procedure, known as playing back the hologram or reconstructing an image of the object, then allows a viewer to see an image of the object by looking into the hologram as though the hologram were simply a window between the viewer and the object. In prior art, holograms are usually produced with easily reproducible reference waves so that they can be played back easily by anyone who desires to see the information in the hologram.

Figure 5:
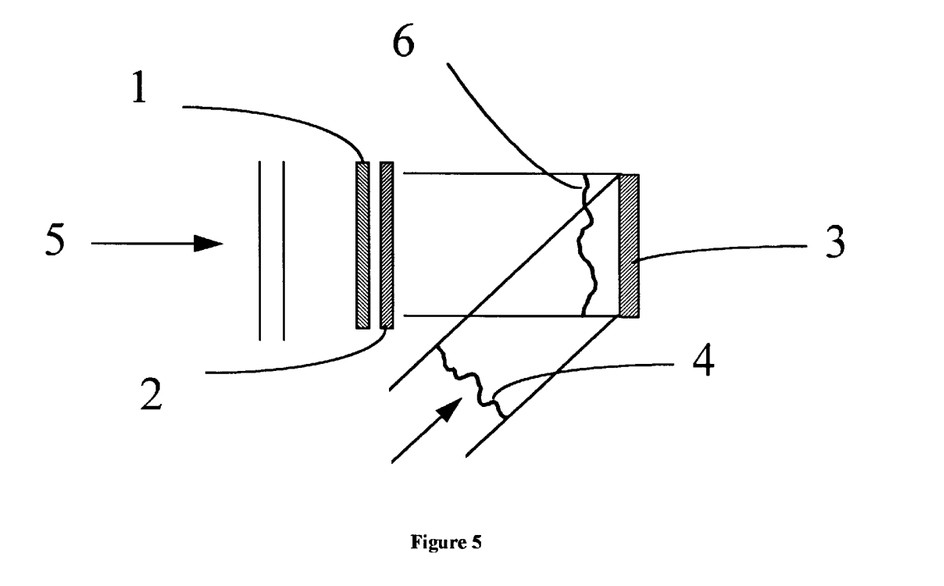
FIG. 5 shows how the holographic security label is recorded by mixing a coded reference wave with scrambled identification information.

In the present invention the hologram 3 is produced as shown in FIG. 5 using an object wave and a reference wave. The object wave is produced by passing a plane wave 5 through a transparency 1 or other modulating means that adds useful information to the light wave. For example, the information may contain data describing a person or object for whom the card is intended to identify. Instead of employing an easily reproducible reference wave, as in prior art, this invention records the hologram with a complicated reference wave 4 requiring the same complicated reference to play the hologram back and view the information contained in it. This invention takes advantage of the fact that approximately the same reference wave used to produce the hologram must be used to play it back. In this invention the reference wave 4 is modulated with extremely complicated information known and available only to the originator of the produced hologram. The modulating means for making the reference wave complicated include passing light through any light modulator that can be saved for later use by the producer of the hologram. Such modulating means may, for example, comprise passing the reference wave 45, used in ordinary hologram production shown in FIG. 3, through a random optical diffuser or any other optical device that adds complicated phase and/or amplitude modulation to an optical wavefront before the light is employed as a reference wave in producing the hologram.

Information contained in a hologram resides in the recordings of interference fringes that result from coherent mixing of the object and reference waves. In a volume hologram the interference fringe information exists in three dimensions in the recording material. If the fringes are oriented other than normal to the recording material, then they cannot be copied or duplicated by measuring the transmissivity or optical path through the recording material. If the fringes are formed by mixing some object wavefront and a simple point source wavefront, the information in the object wavefront can be reconstructed if the fringes are illuminated by an approximation of the simple point source wavefront. If the fringes are formed by two coherent wavefronts, neither of which is generated by a simple point source, then the interference fringes are such that no simple point source can be used to reconstruct either of the wavefronts used to produce the hologram. The holographic security label of the preferred embodiment of this invention is designed as a volume hologram of the last type. As a result, the information is distributed in a three-dimensional pattern in the material, rendering the hologram almost impossible to copy by any conventional means. To make copying even more difficult, the recorded fringes in the emulsion can be purposely shrunk in spacing during processing. This requires that a different wavelength of light be used to play back the hologram.

FIG. 5 shows also how a second level of security can be added to the information stored in the holographic security label. An amplitude and/or phase modulating means 2 scrambles the information in the wavefront emerging from the transparency 1, so that the information in the scrambled wavefront 6 is not meaningful to a viewer. The scrambled wavefront 6 containing both the useful transparency data and the scrambling data, is recorded in hologram 3 by mixing it with reference wavefront 4 and recording the intensity of the sum.

Figure 6:
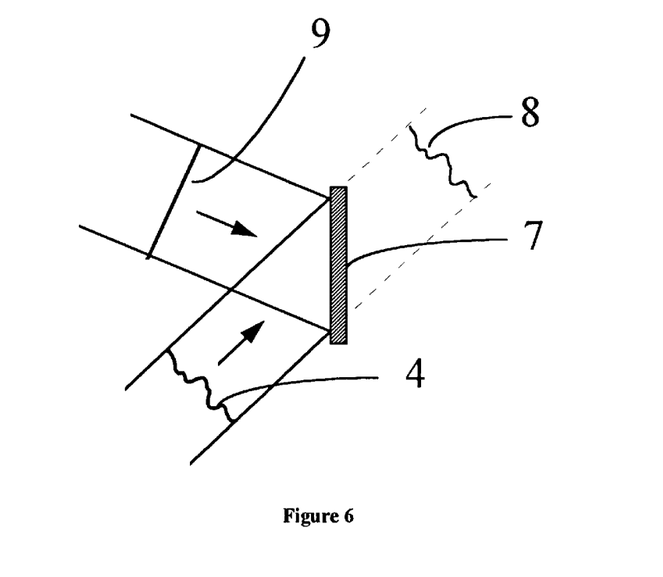
FIG. 6 shows how a holographic key is produced to allow access to the information stored in the holographic label of FIG. 5 by an authorized person.

FIG. 6 shows one method of producing the holographic key that can be used to unlock and access the data in the holographic security label 3. The holographic key is a hologram 7 that is produced by mixing the same wave 4 used to produce the holographic security label 3 with a plane coherent wave 9. When this hologram is re-illuminated with a plane wave approximately the same as wave 9, a wave 8 that approximates wave 4 will emerge from the hologram. This invention further takes advantage of the wavefront storing properties of holograms, using a hologram to store the complicated reference wave required to reconstruct the information contained in the holographic security label.

The reference hologram 34 is produced by the same procedure as the holographic security label 3 except that wavefront 4 is a plane wave. When the reference hologram 34 is re-illuminated by the plane waves 33 the reconstructed wave is identical to wave 6. Since the reference hologram resides in the reading machine, it is not easily available to the potential counterfeiter who would need to copy it to access information in the holographic security label. For added security, the reading machine can be designed such that it cannot be opened without destroying the two holograms contained inside.

Figure 7:
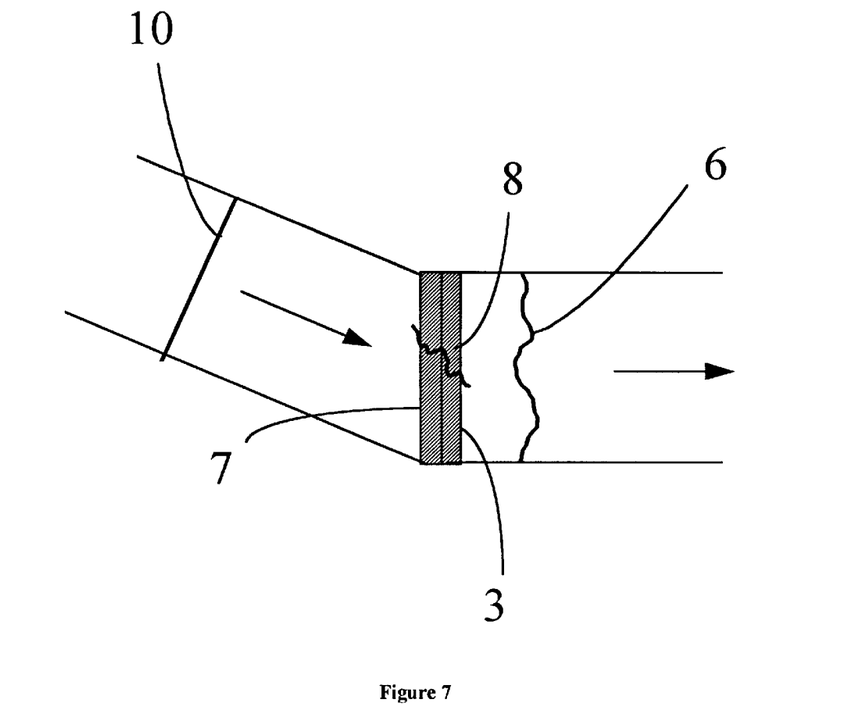
FIG. 7 shows how the holographic key is used to unlock the holographic security label and allows access to the information contained in the label.

FIG. 7 shows how the reading machine illustrated in FIG. 1 aligns the holographic security label 3 adjacent to the holographic key 7. When the aligned pair of holograms is illuminated by a plane wave 10, a reconstructed wave 8 is produced which is sufficiently similar to the reference wave 4 to reconstruct the wavefront 6 contained in the holographic security label 3. Wavefront 6 emerges from hologram 3 and contains the useful information plus any coding information stored in it. Since holograms 3 and 7 are in direct contact, this method of producing wavefront 4 has the advantage that wavefront 8 can be easily aligned to the holographic security label 3.

When the information contained in holographic security label 3 is recorded without the coding means 2 shown in FIG. 5, the wavefront 6 emerging from the two holograms shown in FIG. 7 can be viewed and understood directly by human eye or some other conventional reader such as a TV camera.

Referring to FIG. 1 a card 41 such as an identification card, containing hologram 3 is inserted into a reading machine which automatically analyzes the wavefront that emerges from the accessed holographic security label by comparing it with a wavefront generated in the reading machine. The card 41 serves as a mounting fixture for a holographic label 3 that is attached to the card. The card 41 is guided by a card aligning means 42 that positions the card into the reading machine. The preferred embodiment employs the holographic label in the transmission mode, wherein light is transmitted through the label; however, the holographic label can also be employed in a reflection mode, wherein light is reflected from the holographic label.

The makeup of the reading machine, which incorporates a joint transform, optical correlator to automatically read a label, can be explained with the use of FIG. 2, and FIG. 8 through FIG. 10. The two-dimensional Fourier transform of an amplitude distribution of light characterizes the distribution in terms of its spatial frequency content, which is sometimes a more convenient way to characterize and analyze information.

Figure 8:
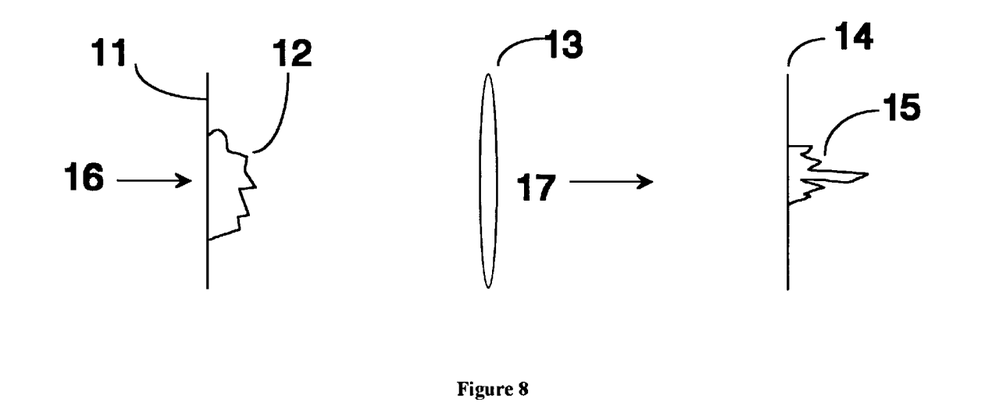
FIG. 8 shows how a lens can be used to transform a two-dimensional amplitude distribution of light existing in the input focal plane into the Fourier transform of the distribution in the output focal plane.

FIG. 8 represents an optical means for producing the two-dimensional Fourier transform of a planar distribution of light amplitude and/or phase. A transparency 11 which contains the two-dimensional information, can be produced from a photographic negative or by other means, such as use of a spatial light modulator. The transparency 11 stores the information in the form of optical density (an attenuating property) and/or optical thickness (a property that changes the phase of the light passing through the transparency). If transparency 11 is illuminated by a plane, coherent light source 16 light transmitted through the transparency is attenuated in amplitude and modulated in phase by the transparency after which the light is collected by Fourier transform lens 13. The light passing through the lens is transformed into a wavefront 17 that falls on Fourier transform plane 14. The distribution of light in the Fourier transform plane is the two-dimensional Fourier transform of the information contained in the transparency.

Figure 9:
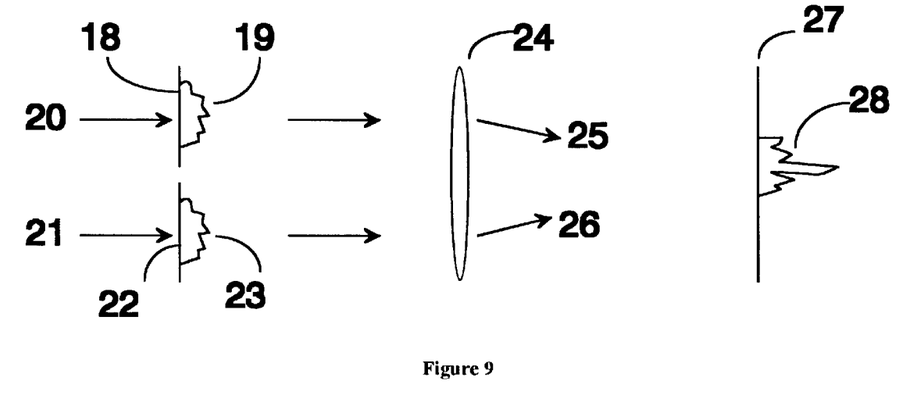
FIG. 9 shows how two input amplitude distributions existing in the input focal plane of a lens are Fourier transformed and summed at the output focal plane, resulting in a system known as a joint transform correlator.

FIG. 9 shows how the Fourier transforming property of a lens shown in FIG. 8 is used to cross-correlate or compare the information in two transparencies, or to compare the information in any pair of two-dimensional amplitude distributions of light created by any means. The transparencies 18 and 22 are placed in the input plane to lens 24 and illuminated with the plane, coherent wavefronts 20 and 21. The emerging, two-dimensional amplitude distributions 19 and 23 are transformed into wavefronts 25 and 26, which mix at the Fourier transform plane 27. At plane 27 the two wavefronts 25 and 26 add coherently, forming the sum of two Fourier transforms of two distributions 19 and 23. It is known that by further converting the amplitude distribution 28 into an intensity distribution in plane 27, and Fourier transforming the result, a measure of the cross-correlation of the two amplitude distributions 18 and 22 can be obtained. A method of accomplishing this correlation using a CCD array in the Fourier plane 27 is described by Horner.

The preferred embodiment of the present invention incorporates a real-time photosensitive material in detecting plane 27 in order to simplify the JTC means. Such materials include the class of materials being partially transparent and having the characteristic that their optical properties change according to the amount of light to which they are exposed. The materials also have the characteristic that they can be refreshed many times, so that they can be used over and over to detect many different optical distributions. An example of such a material is the photochromic protein, bacteriorhodopsin, a material whose transmissivity and refractive index change in proportion to its exposure to light. When the exposure is removed, the optical properties return to their original condition.

Operation—FIGS. 1, 2, 5, 7, 9, 10

FIG. 7 shows how to access information in the holographic security label 3 by placing the holographic key 7 in a position that causes the required reference wave 4 to strike the holographic security label 3. When the aligned pair is illuminated by a plane wave 10 a reconstruction wave 8, necessary to play back holographic security label 3 is produced by the holographic key 7. Wavefront 6 emerges from hologram 3 and contains the information stored in the hologram. When the information contained in holographic security label 3 is recorded without the coding means 2, the wavefront 6 emerging from the two holograms shown in FIG. 7 can be viewed and understood directly by human eye or some other conventional reader such as a TV camera. The holographic key is slid over the holographic security label while illuminating the two. As the key comes into proper alignment, the optical information stored in the label will begin to emerge from the label and will be in its most clearly distinguishable form when the key and the label come into proper alignment. Such alignment is relatively simple to achieve while observing the image emerging in the holographic security label as the holographic key is manually moved over it.

Figure 2:
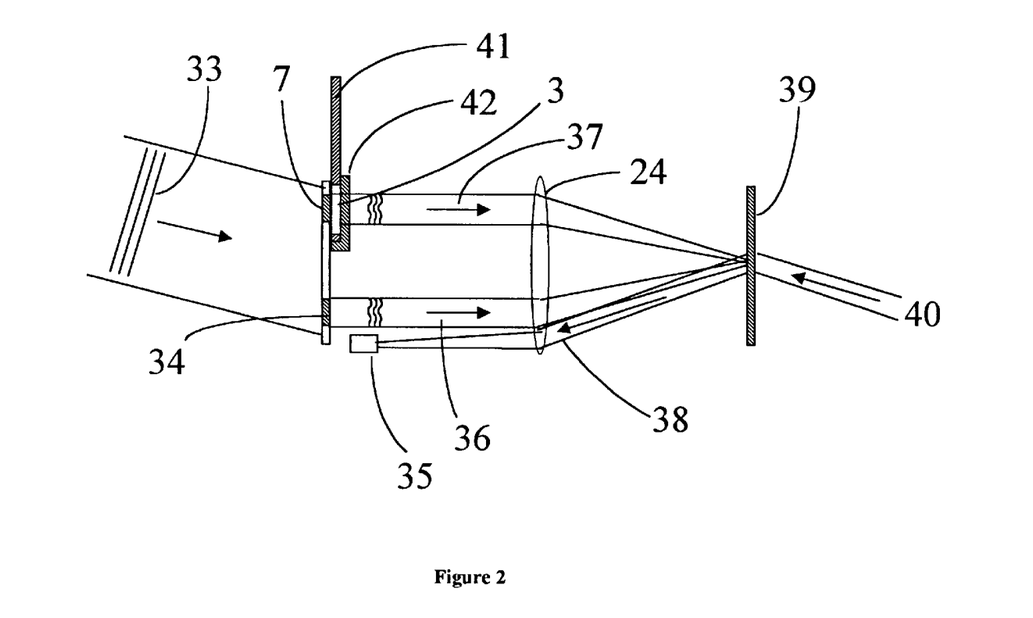
FIG. 2 is a side view of the invention, showing how a holographic ID card is inserted into the reading machine, which decodes and reads the card then automatically compares the information in the ID card with data stored in the reading machine.

The holographic security label can be read automatically by inserting it into the reading machine, as shown in FIG. 2. A card 41, such as an identification card, serves as a mounting fixture for a holographic label 3, which is attached to the card. The card is guided by a card-aligning means 42 that positions the holographic security label into precise alignment over the holographic key 7 which is resident in the reading machine. The two holograms 3 and 7 are then illuminated by a collimated laser beam, which resides in the reading machine.

Referring again to FIG. 2, the information in the holographic label 3 is accessed and passes in the wavefront 37 into the lens 24. The reference hologram 34, which is resident in the reading machine, is illuminated by a plane coherent wavefront and a wavefront 36 is reconstructed from it. Wavefront 36 contains information that is to be compared with wavefront 37, which characterizes the holographic security label. If, for example, wavefront 37 contains information describing how a person looks, then wavefront 36 will contain the same information which can be drawn either from the person presenting the card by using a device such as a CCD camera or from a separate database that stores information describing all persons or objects for which the holographic security labels are designed to identify and authenticate.

In the preferred embodiment, the reading machine uses a JTC to compare the two wavefronts 36 and 37 by focusing them onto a photosensitive material 39 that is also illuminated by a read beam 40. The contrast and straightness of the interference fringes formed in the material 39 provides a direct measure of the cross-correlation of the two interfering beams. If the wavefronts 36 and 37 are identical, then the Fourier transforms of the two distributions are identical and will produce straight, high contrast fringes in the plane of the photosensitive material 39.

The contrast and straightness of the fringes is determined by illuminating the material 39 with the read beam 40 that diffracts part of the light into wavefront 38. The angular distribution of the light in wavefront 38 is related to the contrast and straightness of fringes at 39, and therefore, to the similarity of the two wavefronts 36 and 37. In the case of high correlation between the two wavefronts 36 and 37, most of the light in wavefront 38 will be in a single direction corresponding to the nominal fringe spacing at 39. Lens 24 is again used to focus wavefront 38 onto the detection means 35 that is positioned at the focal point of wavefront 38 that corresponds to the case where beams 36 and 37 are identical. The intensity of the focused wavefront 38 is read by the detector 35. The output of the detector thereby characterizes the information in the holographic security label. For example, if the label is valid or if the information contained in the label matches correctly with information in the reference hologram, a relatively strong signal will be indicated by detector 35. Other more sophisticated detection means might also be used to enhance the correlation discrimination by measuring the intensity distribution of the focused wavefront 38 at two or more points in the plane of the detector 35.

The physics of the JTC can be better understood by referring again to FIG. 9. When a light distributions 19 and 23 are placed in the input plane to lens 24, the emerging, two-dimensional amplitude distributions are transformed into wavefronts 25 and 26. These two wavefronts fall on Fourier transform plane 27, where they add coherently to produce interference fringes. The straightness and contrast of the interference fringes is related to the cross correlation of the two interfering beams. If the distributions 19 and 23 are identical then the Fourier transforms of the two distributions are identical and will produce straight, high contrast fringes in plane 27.

Figure 10:
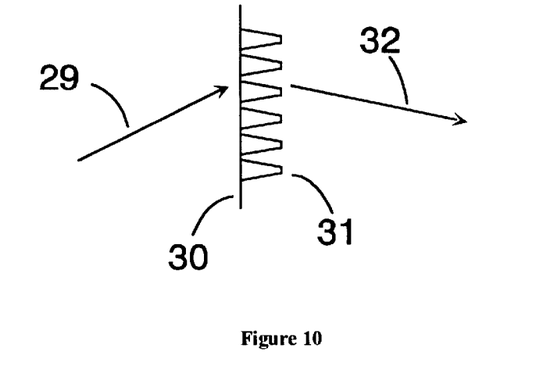
FIG. 10 shows how a diffraction grating diffracts an input beam of light.

FIG. 10 shows how an optical grating 30 that is characterized by alternating regions of varying optical properties 31 diffracts an incident wavefront 29 into a beam of light, 32. The alternating properties may comprise changes in transmissivity of the grating or changes in refractive index. In the present invention, the detecting plane 39 in FIG. 2 is furnished with an approximately transparent detecting means that forms an optical grating similar to the one shown in FIG. 10. The resultant grating in plane 39 is used to measure the cross-correlation of the input signals 36 and 37. The detecting material has the characteristic that it can be refreshed many times, so that it can be used over and over to cross correlate many different optical distributions.

The optical signal emerging from the holographic security label, 3, can contain two or more levels of security and can be used to accomplish two distinctly different tasks: (1) authentication of the security label, and (2) identification of the person or object for which the label is designed.

For authentication of the label, a coded authentication wavefront can be stored in the holographic security label. The reading machine will produce the same coded wavefront from a second hologram 34 to be compared in the JTC. One authentication wavefront can serve for authentication of many different security labels as long as they all contain the authentication wavefront that is resident in the reading machine.

If the security label contains information that is specific to the individual or object for which the holographic security card is especially designed, then the same information is either stored in the reading machine or read by using an input device such as a CCD camera when the card is presented. With either method, the wavefront 36 will be the same as wavefront 37 when the correct security label is inserted in the machine.

Summary, Ramifications, and Scope

Accordingly, it can be seen that the invention provides means for security marking or labeling an object, such as a manufactured part, a document, a security entry card, or other type of identification card with a holographic label in such a manner that the mark is extremely difficult to copy, reproduce, or analyze without a special key that is known only by the possessor of the key. The key hologram provides a simple, easily aligned means of producing the complex wavefront required to reconstruct the information in the holographic label. The invention also provides a relatively simple, low-cost reading machine to inspect the security label automatically and to compare the information contained in it with other reference information. The security label of the invention is easily readable by an authorized person and is virtually unreadable by an unauthorized person. The security label can be produced by an authorized person at low cost per marking.

Although the present invention contains many specifics, these should not be construed as limiting the scope of the invention but as merely providing illustrations of some of the presently preferred embodiments of this invention. Various other embodiments and raimifications are possible within it's scope. For example, the holograms described are employed in the transmission mode, while the same features of the invention can be attained by employing holograms in the reflection mode. Holograms described above are recorded by mixing laser light from the object and reference beams and recording on a suitable recording. It is well known that such holograms can be produced without laser light by computer generating them and by using etching procedures. Thus the scope of the invention should be determined by the appended claims and their legal equivalents, rather than by the examples given.

We claim:

1. A device for verifying the authenticity of an object, said device comprising:
   a. an authenticating hologram having optical information, said authenticating hologram being attachable to said object, and
   b. a coded reconstruction wavefront produced with a holographic key, said optical information being viewable only using said coded reconstruction wavefront, said optical information in said authenticating hologram being viewable by placing said holographic key in contact with said authenticating hologram and illuminating said holographic key with a simple wavefront source.

2. The device of claim 1 wherein said authenticating hologram and said key hologram are volume holograms.

3. The device of claim 1 wherein said optical information in said authenticating hologram consists of only phase information.

4. The device of claim 1 wherein said authenticating hologram is a transmission hologram.

5. The device of claim 1 wherein said authenticating hologram is a reflection hologram.

6. The device of claim 1 wherein said authenticating hologram is produced by using a computer generated diffraction pattern.

7. The device of claim 1 wherein said authenticating hologram contains a complex three-dimensional diffraction pattern.

8. A method of verifying the authenticity of an object comprising the steps of:
   a. creating an authenticating holographic label by mixing optical information with a coded reference wave,
   b. attaching said authenticating holographic label to said object,
   c. creating a holographic key for producing an approximate replica of said coded reference wave, and
   d. reconstructing said optical information on demand by placing said authenticating holographic label in contact with said holographic key and illuminating said holographic key with a simple wavefront source.

9. The method of claim 8 wherein said step of creating an authenticating holographic label comprises the step of:
   creating an authenticating holographic label by mixing optical information with a coded reference wave such that said authenticating holographic label is a volume hologram that fails to reconstruct said optical information when illuminated with a simple wavefront source.

10. The method of claim 8 wherein said step of creating an authenticating holographic label comprises the step of creating said authenticating holographic label by mixing optical information with a coded reference wave, said optical information being combined with a scrambling phase mask to yield a combination, said combination being recorded as a hologram in said authenticating holographic label using said coded reference wave.

11. A method of verifying the authenticity of an object comprising the steps of:
   a. creating a holographic label by mixing optical information with a coded reference wave,
   b. attaching said holographic label to said object,
   c. creating a holographic key for producing an approximate replica of said coded reference wave,
   d. reconstructing said optical information on demand by placing said holographic label in contact with said holographic key and illuminating said holographic key with a simple wavefront source,
   e. comparing said optical information against a reference mask,
   f. producing a correlation signal indicative of a degree of match between said optical information and said reference mask.

12. A system for verifying the authenticity of an object said system comprising:
   a. means for providing a seal for verifying the authenticity of said object to which said seal is applied, said seal including a hologram with optical information that is viewable only by using a coded reconstruction wavefront,
   b. means for coupling said seal to said object in a manner such that said seal cannot be removed from said object without destroying said optical information,
   c. means for inspecting said seal by placing a second hologram in contact with said seal and illuminating said second hologram with a simple wavefront source, said second hologram including a reconstructed image which is an approximate replica of said coded wavefront.

13. The system of claim 12 wherein said seal contains biometric information.

14. A method of verifying the authenticity of an object comprising the steps of:
   a. providing a planar identification member,
   b. affixing a seal to said planar identification member, said seal including a first hologram having optical information only viewable using a coded reconstruction wavefront, and
   c. inspecting said seal by placing a second hologram in contact with said first hologram and illuminating said second hologram with a simple wavefront source, said second hologram having a reconstructed image that is an approximate replica of said coded wavefront.

15. A method of controlling access to a facility comprising the steps of:
   a. recording biometric information of a person in a first hologram having optical information only viewable using a coded reconstruction wavefront,
   b. reconstructing said biometric information by placing a second hologram in contact with said first hologram and illuminating said second hologram with a simple wavefront source, said second hologram having a reconstructed image that is an approximate replica of said coded wavefront,
   c. comparing said biometric information reconstructed in step (b) with a currently produced biometric signature to determine a positive or a negative identity of said person, and
   d. granting entry of said person upon generation of a positive identity match in step (c).

16. A method of controlling access to a facility comprising the steps of:
   a. recording optical information including biometric information of a person and a phase and/or amplitude code in a first volume hologram, said optical information being viewable only by using a coded reconstruction wavefront,
   b. reconstructing said optical information by placing a second hologram in contact with said first hologram and illuminating said second hologram with a simple wavefront source, thereby producing a wavefront that is an approximate replica of said coded wavefront,
   c. comparing said biometric information reconstructed in step (b) with a currently produced biometric signature,
   d. comparing said phase and/or amplitude code with a reference code, and
   e. granting entry of said person upon generation of a positive identity match in step (c) and a positive comparison of said phase and/or amplitude code and said reference code in step (d).

* * * * *

UNITED STATES PATENT AND TRADEMARK OFFICE
CERTIFICATE OF CORRECTION

PATENT NO : 5,920,058
DATED : July 6, 1999
INVENTOR(S): David C. Weber and James D. Trolinger It is certified that error appears in the above-identified patent and that said Letters Patent is hereby corrected as shown below:

In column 1, after the Title of the Invention and before line 5, please insert:

--This invention was made with Government support under Grant DE-FG03-94ER81672 awarded by the Department of Energy and Contract No. F19628-96-C-0010 awarded by the Department of Defense. The government has certain rights in this invention.--

Signed and Sealed this

Tenth Day of October, 2000

Attest:

Attesting Officer

Q. TODD DICKINSON

Director of Patents and Trademarks